B. H. URSCHEL.
UNIVERSAL JOINT.
APPLICATION FILED MAR. 14, 1917.

1,313,508.

Patented Aug. 19, 1919.

UNITED STATES PATENT OFFICE.

BERTIS H. URSCHEL, OF BOWLING GREEN, OHIO, ASSIGNOR TO UNIVERSAL MACHINE COMPANY, OF BOWLING GREEN, OHIO.

UNIVERSAL JOINT.

1,313,508.   Specification of Letters Patent.   Patented Aug. 19, 1919.

Application filed March 14, 1917. Serial No. 154,654.

*To all whom it may concern:*

Be it known that I, BERTIS H. URSCHEL, a citizen of the United States, residing at Bowling Green, in the county of Wood and State of Ohio, have invented certain new and useful Improvements in Universal Joints; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to universal joints especially adapted for use in connection with automobiles, and is designed to furnish a cheap and simplified construction, of extreme flexibility and extensibility; in which the parts are protected from dust and grit; in which the waste and escape of the lubricant is avoided, and in which the shell or casing is utilized to serve as one of the joint-members.

To these ends my device consists of the devices, construction and arrangement of parts hereinafter described, and illustrated in the accompanying drawings, in which—

Figure 1:
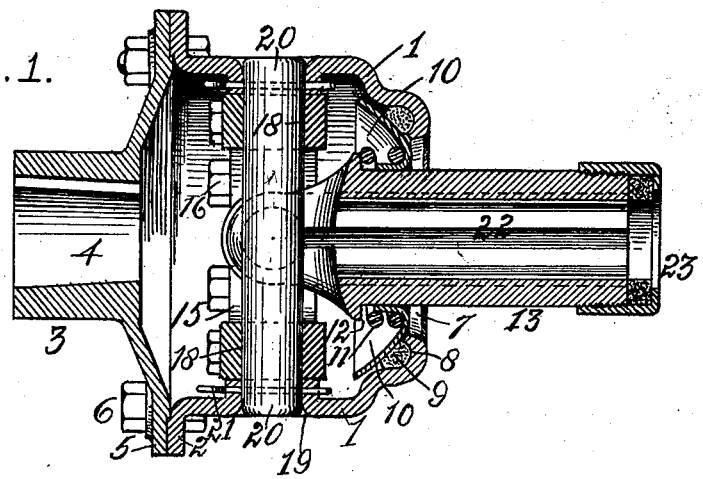
Figure 2:
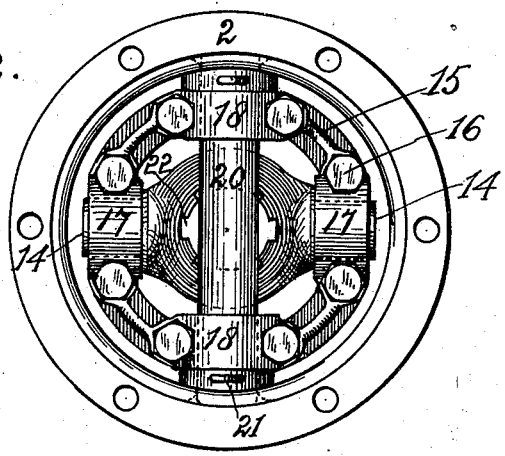
Figure 3:
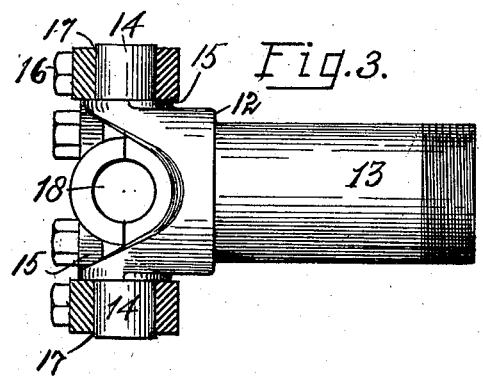
Figure 4:
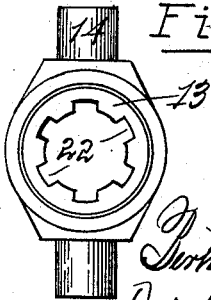

Figure 1 is a central transverse sectional plan-view of my device; Fig. 2, an end-elevation of the same with the cap hereinafter referred to, removed; Fig. 3, a side-elevation of one of the shaft-members herein referred to, showing its bearings in the ring, hereinafter referred to, and Fig. 4, an end-elevation of said shaft-member seen from its outer end.

Like numerals of reference indicate like parts throughout the drawings.

In the drawings, 1 is a cup-shaped case or shell open at both ends, the larger opening being flanged as at 2. This opening has a closure 3 having therethrough a central shaft-opening 4, the closure being provided with a flange 5 corresponding to the flange 2. The two flanges are secured, face to face, by means of bolts and nuts 6. The edge of the opposite, smaller opening 7 is turned inwardly to form a circular groove 8 in which is a lubricated packing-ring 9. 10 is a plate the outer surface of which is formed as the segment of a sphere which surface is pressed outwardly against the packing-ring 9 by means of an internal spring 11 interposed between a shoulder 12 on the driven shaft 13 and the inner side of the plate 10. A flanged central opening in the plate 10 closely embraces the shaft-member 13.

The inner end of the shaft 13 is bifurcated, the bifurcations terminating in two oppositely projecting gudgeons or trunnions 14, journaled in bearings 17—17 in a ring 15. This ring consists of two like ring-parts secured together, side by side, by bolts 16, the rings having coincident enlargements in which are opposed semi-cylindrical depressions which afford four bearings 17—17 and 18—18 disposed at right angles to each other.

In opposite sides of the shell 1 are alined holes 19 having inwardly turned lips. 20 is a shaft the ends of which fit closely in the holes 19, the shaft being held against longitudinal and axial movements by means of pins 21 passing through the lips of the holes and through the shaft. Upon the shaft 20 are journaled the two bearings 18—18 formed in the two-part ring 15.

The part 3—4 is secured rigidly in any preferred manner to a driving shaft. The shaft-member 13 is internally grooved as at 22 for the reception of a correspondingly splined shaft,—not shown. The outer end of the shaft-member 13 is provided with a gland 23 which prevents the escape of lubricant from the interior of the shell around the internal shaft.

It will now be seen that the shell provides protection for the bearings of the device against access of grit and dirt; that the two shaft-members have a wide range of movement relatively to each other, both angularly and longitudinally; that the lubricant is confined so that it cannot waste and so that the exterior of the joint can not become smeared with grease, and that the inclosing shell of the device itself is utilized to form a shaft-support for two of the several bearings.

Having described my invention, what I claim and desire to secure by Letters Patent, is—

1. In a device of the described character, a shaft member, a substantially cylindrical casing adapted at one end for rigid connection with one end of such shaft member, a transverse shaft within and engaged with the opposite sides of said casing, another shaft member extending through a hole in the other end of the casing and having a bifurcated inner end with oppositely projecting gudgeons, and a ring composed of two parts having therebetween and disposed in the same plane at right angles to each other bearings for said transverse shaft and bearings for said gudgeons.

2. A device of the described character comprising a substantially cylindrical casing adapted for rigid connection with the end of a driving shaft, a shaft mounted internally and transversely of and engaged with said casing in its opposite sides, a ring consisting of two like parts secured together side by side and journaled at its opposite sides on said shaft, and a driven shaft-member extending through a hole in said casing and having a bifurcated inner end provided with oppositely projecting gudgeons which are journaled in said ring at a right-angle to said transverse shaft, in combination with an outwardly pressed yielding oil-tight closure for said hole.

In testimony whereof I affix my signature in presence of two witnesses.

BERTIS H. URSCHEL.

Witnesses:
L. M. SILVERTHORNE,
F. A. CUMMEROW.

Copies of this patent may be obtained for five cents each, by addressing the "Commissioner of Patents, Washington, D. C."